US010323462B2

(12) United States Patent
Delwiche et al.

(10) Patent No.: US 10,323,462 B2
(45) Date of Patent: Jun. 18, 2019

(54) STABILIZER-REAMER FOR DRILL STRING

(71) Applicant: FASTIP SA, Fleurus (BE)

(72) Inventors: Robert Delwiche, Uccle (BE); Harrie Oort, Laurencekirk (GB); Nicholas Biggs, Aberdeen (GB); Etienne Lamine, Court-Saint-Etienne (BE)

(73) Assignee: FASTIP SA, Fleurus (BE)

( * ) Notice: Subject to any disclaimer, the term of this patent is extended or adjusted under 35 U.S.C. 154(b) by 69 days.

(21) Appl. No.: 15/314,399

(22) PCT Filed: May 20, 2015

(86) PCT No.: PCT/EP2015/061069
§ 371 (c)(1),
(2) Date: Nov. 28, 2016

(87) PCT Pub. No.: WO2015/181010
PCT Pub. Date: Dec. 3, 2015

(65) Prior Publication Data
US 2017/0198527 A1 Jul. 13, 2017

(30) Foreign Application Priority Data
May 30, 2014 (BE) .................................. 2014/0411

(51) Int. Cl.
*B23K 1/00* (2006.01)
*B23K 26/34* (2014.01)
*C22C 29/02* (2006.01)
*E21B 10/26* (2006.01)
*E21B 10/54* (2006.01)
*E21B 10/55* (2006.01)
(Continued)

(52) U.S. Cl.
CPC ............ *E21B 10/56* (2013.01); *B23K 1/0008* (2013.01); *B23K 26/34* (2013.01); *C22C 29/02* (2013.01); *E21B 10/26* (2013.01); *E21B 10/55* (2013.01); *E21B 17/1078* (2013.01); *B23K 2101/002* (2018.08); *B23K 2103/50* (2018.08); *E21B 2010/545* (2013.01)

(58) Field of Classification Search
CPC ........ E21B 10/56; E21B 2010/561–2010/566; E21B 10/567–10/5736
See application file for complete search history.

(56) References Cited

U.S. PATENT DOCUMENTS 3,250,578 A * 5/1966 Lubbes ............... E21B 17/1078
175/325.2
3,268,274 A * 8/1966 Ortloff ................ E21B 17/1078
175/325.4
(Continued)

FOREIGN PATENT DOCUMENTS

GB 2377722 1/2003
WO 2004029402 4/2004

*Primary Examiner* — Blake E Michener
(74) *Attorney, Agent, or Firm* — Duane Morris LLP; Gregory M. Lefkowitz; Jason M. Nolan

(57) ABSTRACT

Stabilizer-reamer for drilling string characterized in that it comprises a mixture of diamond impregnated inserts, the mixture comprising cutting diamond impregnated inserts and wear resistant diamond impregnated inserts, said wear resistant diamond impregnated inserts having smaller diamond grain size and higher diamond concentration than said cutting diamond impregnated inserts.

16 Claims, 9 Drawing Sheets

(51) Int. Cl.
*E21B 10/56* (2006.01)
*E21B 17/10* (2006.01)
*B23K 101/00* (2006.01)
*B23K 103/00* (2006.01)

(56) References Cited

U.S. PATENT DOCUMENTS

| | | | | |
|---|---|---|---|---|
| 3,343,615 A | * | 9/1967 | Terry | E21B 10/26 175/406 |
| 3,575,247 A | * | 4/1971 | Feenstra | E21B 10/46 175/406 |
| 4,618,010 A | * | 10/1986 | Falgout, Sr. | E21B 10/26 175/385 |
| 4,662,461 A | * | 5/1987 | Garrett | E21B 17/1078 175/325.4 |
| 4,854,399 A | * | 8/1989 | Zijsling | E21B 7/06 175/61 |
| 5,474,143 A | * | 12/1995 | Majkovic | E21B 10/26 175/323 |
| 6,386,302 B1 | * | 5/2002 | Beaton | E21B 10/26 175/385 |
| 6,880,650 B2 | * | 4/2005 | Hoffmaster | E21B 10/32 175/263 |
| 8,776,912 B2 | * | 7/2014 | Makkar | E21B 7/28 175/263 |
| 2010/0096189 A1 | * | 4/2010 | Salzer, III | E21B 17/1078 175/92 |
| 2010/0122851 A1 | * | 5/2010 | Wilde | E21B 10/26 175/325.2 |
| 2010/0276201 A1 | * | 11/2010 | Makkar | E21B 7/28 175/57 |
| 2011/0031037 A1 | * | 2/2011 | Bellin | C22C 26/00 175/430 |
| 2012/0111640 A1 | | 5/2012 | Downie et al. | |
| 2013/0146361 A1 | * | 6/2013 | Makkar | E21B 10/322 175/57 |
| 2013/0153306 A1 | * | 6/2013 | Burhan | E21B 10/26 175/406 |
| 2014/0054095 A1 | * | 2/2014 | Mourik | C22C 26/00 175/428 |
| 2014/0246242 A1 | * | 9/2014 | Radford | E21B 10/43 175/61 |

\* cited by examiner

STABILIZER-REAMER FOR DRILL STRING

CROSS-REFERENCE TO RELATED APPLICATIONS

This application is a § 371 national stage entry of International Application No. PCT/EP2015/061069, filed May 20, 2015, which claims priority to Belgian Patent Application No. 2014/0411 filed May 30, 2014, the entire contents of which are incorporated herein by reference.

FIELD OF THE INVENTION

The invention relates to drilling devices and more particularly to a stabilizer-reamer for down-hole equipment.

DESCRIPTION OF PRIOR ART

US43855669 discloses a tool having reaming and stabilizing capabilities. The stabilizer section of the tool reduces the lateral movement of the drill bit as it works its way through rock formation while the reamer section is characterized by the presence of hardened buttons providing a cutting action on the wall of the hole. The protruding buttons enable the stabilizer-reamer to maintain to size any portions of the wall of the hole that are undersize. Hardened buttons are in this document disclosed to be tungsten-carbide buttons or PDC buttons (PDC standing for poly-diamond compact). Tungsten-carbide buttons work sufficiently for normal non-abrasive drilling conditions, but this type of protection no longer meets the needs of modern applications targeting deeper and more difficult sections through or in abrasive rocks. Tungsten-carbide hard facing leads to uncontrollable down hole dynamics with lateral, torsional and axial vibration, and uneconomical performance, forcing the operator to trip out of the hole to replace failed or worn bottom-hole assembly components. On the other hand, the introduction of PDC buttons acting as cutting nodes create shocks and torque variation leading to inefficient dynamics being delivered to the down-hole equipment.

U.S. Pat. No. 8,607,900 describes a down-hole tool having reaming and stabilizing functionalities. PDC cutter nodes are disclosed on the edges of the helical blades. As explained above, although improving cutting power of the tools, such PDC cutter nodes create shocks and torque variation leading to inefficient dynamics being delivered to the down-hole equipment.

EP 1 811 126 also discloses a tool having both reaming and stabilizing capabilities. Carbide inserts are mentioned to improve the reaming capabilities of the tool. The problems associated with this feature are the same as discussed above for the more particular case of tungsten carbide inserts.

WO 2004/029402 discloses again a reamer-stabilizer having carbide inserts or PDC cutters and which has consequently the same drawbacks as the tools disclosed in the other documents of the prior art.

It was also found out that with the devices from the prior art, about 90% of the power provided to the bottom-hole assembly is lost in vibrations of the drilling string. Vibrations can be axial ("bit bounce"), torsional ("stick/slip") or lateral ("bending") and come from a wide range of potential excitation sources: mass imbalance, misalignment and kinks or bends, cutting action of the drill bit, stabilizer blades, mud motors and the friction factor between the drillstring and borehole wall.

SUMMARY OF THE INVENTION

It is an object of the invention to provide a stabilizer-reamer overcoming the aforementioned drawbacks of the devices from the prior art.

To this end, the stabilizer-reamer for the drilling string according to the invention is characterized in that it comprises on its outer surface a mixture of diamond impregnated inserts, the mixture comprising cutting diamond impregnated inserts and wear resistant diamond impregnated inserts, said wear resistant diamond impregnated inserts having smaller diamond grain size and higher diamond concentration than said cutting diamond impregnated inserts.

By mixture of diamond impregnated inserts, it is meant a set of diamond impregnated inserts comprising at least two types of diamond impregnated inserts, said types being characterized by, different diamond grain sizes and/or diamond concentrations, and possibly by other differing parameters like the composition of the impregnated matrix composing the inserts. The expressions cutting diamond impregnated inserts and wear resistant diamond impregnated inserts used throughout this text aim to distinguish between the at least two types of diamond impregnated inserts comprised in the set of diamond impregnated inserts.

Diamond impregnated inserts having coarse diamond grain size and medium diamond concentration have indeed been found to provide efficient cutting structures causing less torque variation in the drilling string compared to PDC cutting inserts from the prior art, and consequently providing a far longer life to the drilling equipment. On the other hand, diamond impregnated inserts having small diamond grain size and high diamond concentration present a low friction coefficient with the rock of the wellbore and consequently provide high wear resistance to the stabilizer-reamer. Stabilizer-reamers comprising a mixture of both types of diamond impregnated inserts have been found to offer superior stabilizing and reaming capabilities compared to the stabilizer-reamers from the prior art.

In an advantageous embodiment of the invention, the cutting diamond impregnated inserts have a diamond grit size comprised between 18/20 and 40/50 mesh ASTM and a diamond concentration comprised between 10% and 35% in volume, and wear resistant diamond impregnated inserts have a diamond grit size comprised between 40/50 and 120/140 mesh ASTM and a diamond concentration comprised between 35% and 60% in volume.

Such diamond concentrations and diamond sizes for the cutting inserts were found to provide an efficient micro-shearing adapted to the reaming of the borehole wall, while the aforementioned diamond concentrations and diamond sizes for the wear resistant inserts provide low friction coefficient to these inserts and consequently an efficient protection against abrasion from the borehole wall. A combination of both kinds of inserts provides consequently at the same time reaming and wear resistance abilities to the stabilizer-reamer according to the invention.

In an advantageous embodiment, the composition of the diamond impregnated inserts comprises at least one metal and one metallic carbide selected from the group consisting of wolfram carbide, titanium carbide, tantalum carbide, chromium carbide, vanadium carbide, niobium carbide and molybdenum carbide. The at least one metal and the metal of the metallic carbide are not the same. Advantageously, the at least one metal is selected from the group of Cobalt, Nickel, Molybdenum, Chromium, Manganese and Iron.

Preferentially, the at least one metal is Cobalt or Nickel, because such metals provide a good mechanical resistance of the metallic phase.

In an advantageous embodiment, the diamond impregnated inserts comprise between 50% and 95% of metallic carbide.

This range was found to provide the best possible wear resistance of the diamond impregnated inserts. Below this range, it was observed that the wear increases dramatically. Above 95%, the inserts become too brittle. It is important to note that while the concentration of diamond is increased in the impregnated inserts, the ratio of carbide is advantageously decreased in to order to have a more resilient matrix. The ratio of carbide is consequently typically lower in wear resistant diamond impregnated inserts than in cutting impregnated inserts In an advantageous embodiment of the invention, the diamond impregnated inserts are brazed on the stabilizer-reamer.

Brazing turns out to be a very efficient method to preserve the integrity of the diamond impregnated inserts, especially diamond impregnated inserts with a high diamond concentration.

In a particularly advantageous embodiment of the invention, the diamond impregnated inserts are brazed at a temperature lower than 850° C.

The structural properties of the brazed diamond impregnated inserts are indeed best preserved under this temperature, because it was observed that above 850° C., the diamond starts being catalysed by most of the metal used in the composition of the diamond impregnated inserts and is consequently transformed into graphite.

In an advantageous embodiment of the invention, the stabilizer-reamer comprises a central cylindrical portion and two tapered portions on either side of said central cylindrical portion. The central cylindrical portion comprises advantageously helical blades.

Such design reduces the shock level at the stabilizer when rotating, while allowing a channel for the fluid to be circulated in the drilling well.

In an advantageous embodiment of the invention, the central cylindrical portion comprises a mixture of diamond impregnated inserts comprising cutting diamond impregnated inserts and wear resistant diamond impregnated inserts. The ratio of cutting diamond inserts in this mixture of diamond impregnated inserts on the central cylindrical portion is advantageously comprised between 0% and 70%. A ratio higher than 70%, although providing a very high reaming power to the stabilizer was found to create a too high friction coefficient between the stabilizer and the borehole wall.

Advantageously, the leading and lateral edges of the helical blades comprise between one and five rows of cutting diamond impregnated inserts and the central part of the helical blades comprises a mixture of cutting diamond impregnated inserts and wear resistant diamond impregnated inserts.

In such a design, the cutting inserts at the leading and lateral edges of the helical blades improve the quality of the wellbore by reaming efficiently the borehole wall.

In an advantageous embodiment, between 40% and 70% of the surface of the helical blades is covered by the diamond impregnated inserts.

In an advantageous embodiment, the diameter of the diamond impregnated inserts is comprised between 6 and 25 mm and their height is comprised between 3 and 30 mm.

In an advantageous embodiment of the invention, the two tapered portions comprise a mixture of diamond impregnated inserts, the mixture comprising cutting diamond impregnated inserts and wear resistant diamond impregnated inserts.

This design for the tapered portions makes them particularly suitable for the front-reaming and back-reaming during drilling.

Advantageously, the ratio of cutting inserts in the two tapered portions is above 50% of the total number of inserts in the mixture of diamond impregnated inserts.

Such ratios were found to provide efficient front-reaming and back-reaming capabilities to the stabilizer-reamer according to the invention.

In an advantageous embodiment, the stabilizer-reamer comprises cylindrical transition zones between the helical blades and the tapered parts, said cylindrical transition zones comprising between two and five rows of cutting diamond impregnated inserts.

The cutting inserts provided in these areas increase the lifespan of the tool because it was observed that the transition zones between the blades and the tapered parts are areas of the tools that are highly exposed to destructive shocks and very abrasive formations from the borehole wall.

In an advantageous embodiment, the tapered portions of the stabilizer-reamer according to the invention comprise diamond impregnated inserts having a shape, diameter and length adapted to form a tapered angle between 5° and 25°. The mixture of diamond impregnated inserts comprises advantageously cylindrical inserts with a flat upper surface and domed inserts of variable curvature.

Such tapered angle and design of the inserts improve the reaming efficiency of the stabilizer-reamer by increasing the contact surface between the back and front reaming areas and the borehole wall.

In another advantageous embodiment, the central cylindrical portion of the stabilizer-reamer comprises a diamond laser cladding, the diamond concentration of said diamond laser cladding being comprised between 20 and 35% in volume, and the diamond grit size being comprised between 40/50 mesh ASTM and 120/140 mesh ASTM. The diamond laser cladding can be applied on the entire surface, or on partial surface with layers of steel in between.

Diamond laser cladding offers an interesting alternative to the brazing of diamond impregnated inserts from the economical point of view.

It is a further object of the invention to provide a method to further improve the stabilizing capabilities of a stabilizer-reamer for a given wellbore.

It was found that to reduce the unintentional vibrations of the drilling string, the optimal global friction coefficient between the stabilizer-reamer and the rock of the wellbore varies from one application to another. It has indeed been found that some applications require a higher global friction coefficient than others to optimally reduce the vibrations in the drilling string. It was observed that a higher global friction coefficient is for example more adapted to vertical or slightly inclined drilling wells, while a lower one is more adapted to deviated or horizontal drilling wells.

To this end, the method to improve the stabilizing capabilities of a stabilizer-reamer according to the invention is characterized in that the friction coefficient between the stabilizer-reamer and the borehole wall is modulated.

By modulated, it is meant that the global friction coefficient of the stabilizer-reamer and borehole wall is adapted to reach a value comprised between 0.02 and 0.8.

In an advantageous embodiment, the friction coefficient between the stabilizer-reamer and borehole wall is modulated by varying the ratio of cutting diamond impregnated inserts and wear resistant diamond impregnated inserts in the mixture of diamond impregnated inserts.

In an advantageous embodiment, the friction coefficient between a stabilizer-reamer according to the invention and the borehole wall is modulated by varying the ratio of cutting diamond impregnated inserts and wear resistant diamond impregnated inserts in the mixture of diamond impregnated inserts on the central part of the helical blades of the stabilizer-reamer.

The global friction coefficient between the stabilizer and the wellbore is indeed varied when the proportion of diamond impregnated inserts having a higher friction coefficient is increased or decreased in the mixture of diamond impregnated inserts. As a rule of thumb, increasing the proportion of cutting diamond impregnated inserts increases the value of the friction coefficient between the stabilizer-reamer and the borehole. The value of the friction coefficient being the results of an interaction between the material of the stabilizer and the borehole, it also depends on parameters related to the rock constituting the borehole. These intrinsic parameters of the borehole need consequently to be taken into account when varying the ratio of the different types of diamond impregnated inserts. The friction coefficient modulated with respect to method according to the invention can typically be adjusted between 0.02 and 0.8.

In an embodiment of the invention, the friction coefficient of a stabilizer-reamer is modulated between 0.3 and 0.6 when the stabilizer is used in drilling a well that is substantially vertical.

By substantially vertical, it is meant a slope between 90° and 70° with respect to the horizontal.

In another embodiment of the invention, the friction coefficient of a stabilizer-reamer is modulated between 0.02 and 0.3 when the stabilizer is used in drilling wells substantially horizontal or deviated.

By substantially horizontal or deviated, it is meant a slope between 0° and 70° with respect to the horizontal.

In another embodiment of the invention, the friction coefficient of a stabilizer-reamer is modulated between 0.3 and 0.6 when the stabilizer is in a near or at-bit position in the drilling string.

It was indeed observed that a higher friction coefficient is preferable for stabilizer in a near or at-bit position in the drilling string in order to reduce destructive dynamic effects being delivered to the bottom-hole assembly.

Globally the ratio of cutting inserts versus wear resistant inserts in the cylindrical part of the blades is around 25% of the total amount of inserts in the mixture of diamond impregnated inserts.

In an advantageous embodiment, the ratio of cutting diamond impregnated inserts and wear resistant diamond impregnated inserts in the mixture of diamond impregnated inserts on the central part of the helical blades of the stabilizer-reamer is varied between 0% and 70% of the total number of diamond impregnated inserts in said mixture of diamond impregnated inserts.

In some embodiments, when high directional requirements are needed the ratio can indeed drop to 5 to 10%, and even can be 0% for horizontal drilling requirement.

In some other embodiments, when high dynamics effects are affecting the bit that ratio can go up to 70%.

As already mentioned above, a ratio higher than 70%, although providing a very high reaming power to the stabilizer was found to create a too high friction coefficient between the stabilizer and the borehole wall.

SHORT DESCRIPTION OF THE DRAWINGS

These and further aspects of the invention will be explained in greater detail by way of example and with reference to the accompanying drawings in which.

The figures are not drawn to scale. Generally, identical components are denoted by the same reference numerals in the figures.

DETAILED DESCRIPTION OF PREFERRED EMBODIMENTS

Figure 1:
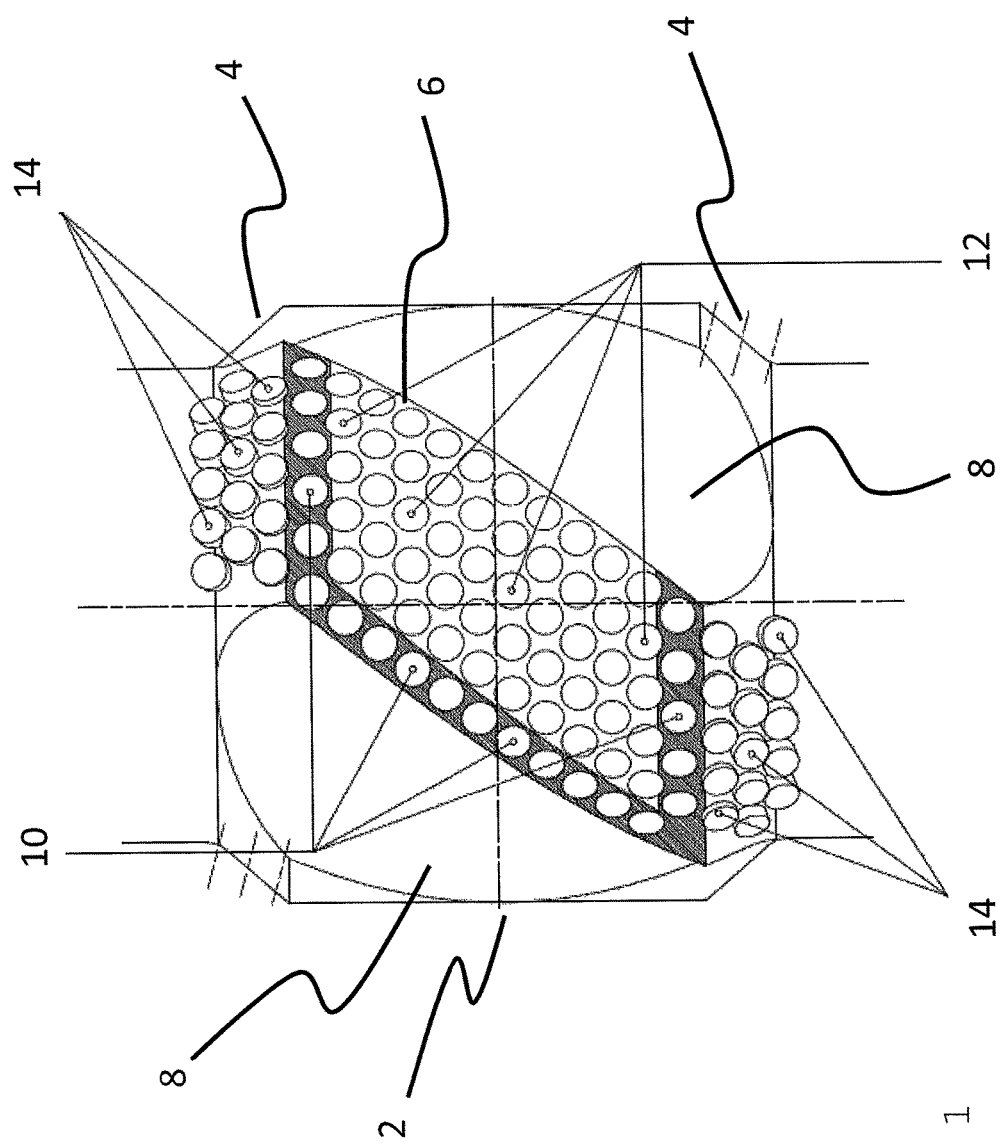
FIG. 1 shows a first embodiment of the stabilizer-reamer according to the invention.

FIG. 1 shows a first embodiment of a stabilizer-reamer according to the invention. The stabilizer-reamer comprises a central cylindrical portion 2 and two tapered portions 4 on either side of said central cylindrical portion. The central cylindrical portion 2 comprises helical blades 6 and flute sections 8 disposed, between the helical blades. The central cylindrical portion 2 also comprises flat or slightly domed diamond impregnated inserts. The leading and lateral edges of the helical blades 6 comprise cutting diamond impregnated inserts 10, while the central part of the blades comprises at least one type of wear resistant inserts 12. The two tapered portions comprise a mixture of diamond impregnated inserts 14, the mixture comprising cutting diamond impregnated inserts and wear resistant diamond impregnated inserts. The design of the tapered portions makes them suitable for front-reaming and back-reaming operations.

All cutting diamond impregnated inserts have a diamond grit size comprised between 18/20 and 40/50 mesh ASTM and a diamond concentration comprised between 10% and 35% in volume, while wear resistant diamond impregnated inserts have a diamond grit size comprised between 40/50 and 120/140 mesh ASTM and a diamond concentration comprised between 35% and 60% in volume. The diameter of the diamond impregnated inserts is typically comprised between 6 and 25 mm and their height is typically comprised between 3 and 30 mm.

Typical compositions for the matrix of the diamond impregnated inserts are the following:
1) wolfram carbide 50 to 94%
   Cobalt 50 to 6%
2) wolfram carbide 40 to 96%
   Cobalt 20 to 2%
   Nickel 30 to 4%
3) wolfram carbide 50 to 94%
   Nickel 50 to 6%
4) Wolfram carbide 40 to 60%
   Titanium carbide 10 to 50%
   Cobalt or Nickel 50 to 10%

5) Chromium carbide 50 to 94%
   Nickel 50 to 6%
6) Titanium carbide 20 to 40%
   Niobium carbide 3 to 10%
   Nickel 30 to 50%
   Molybdenum 10 to 20%
   Aluminium 10 to 20%

A typical composition for the cutting inserts is the following:
Wofram carbide/Nickel, with a weight ratio of 85/15% concentration of 25% in volume of diamond, grit size of diamond being 30/40 mesh ASTM.

Typical compositions for the wear resistant inserts are the following:
1) Wolfram carbide/Cobalt with a weight ratio of 75/25%, concentration of 40% in volume of diamond, grit size of diamond being 40/50 mesh ASTM.
2) Wolfram carbide/Cobalt with a weight ratio of 50/50%, concentration of 60% in volume of diamond, grit size of diamond being 70/80 mesh ASTM.

These three types of inserts can typically be present on a single stabilizer-reamer according to the invention. A stabilizer according to the invention comprises indeed at least one type of cutting inserts and one type of wear resistant inserts, but can also comprise more than two different types of inserts. It can for example comprise two types of wear resistant inserts with the aforementioned typical compositions.

It is important to note that while the concentration of diamond is increased in the impregnated inserts, the ratio of carbide is advantageously decreased in to order to have a more resilient matrix. The ratio of carbide is consequently typically lower in wear diamond impregnated inserts than in cutting impregnated inserts.

Figure 2:
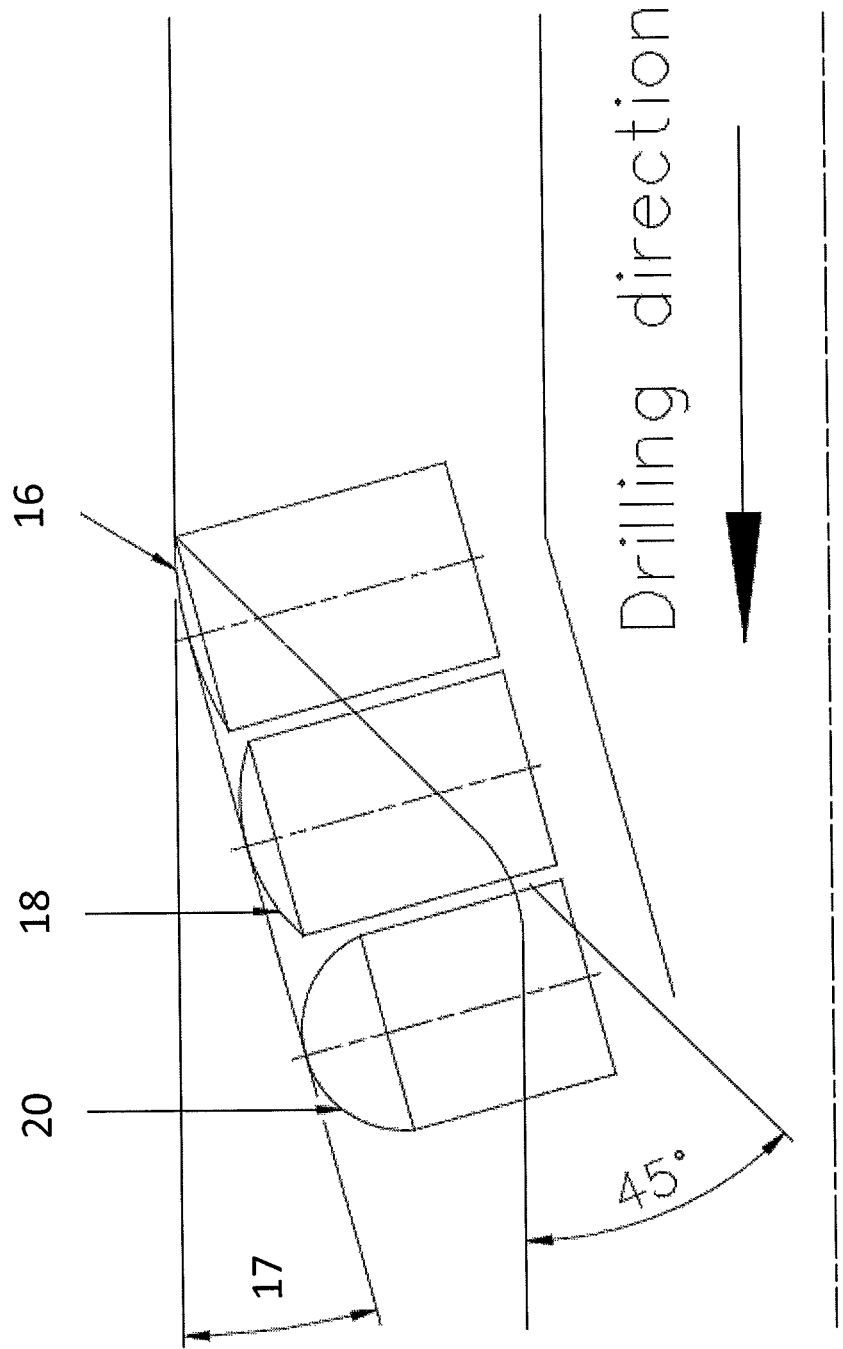
FIGS. 2 and 3 shows in more details embodiments of the junction between the tapered parts and the cylindrical part of a stabilizer-reamer according to the invention.
Figure 3:
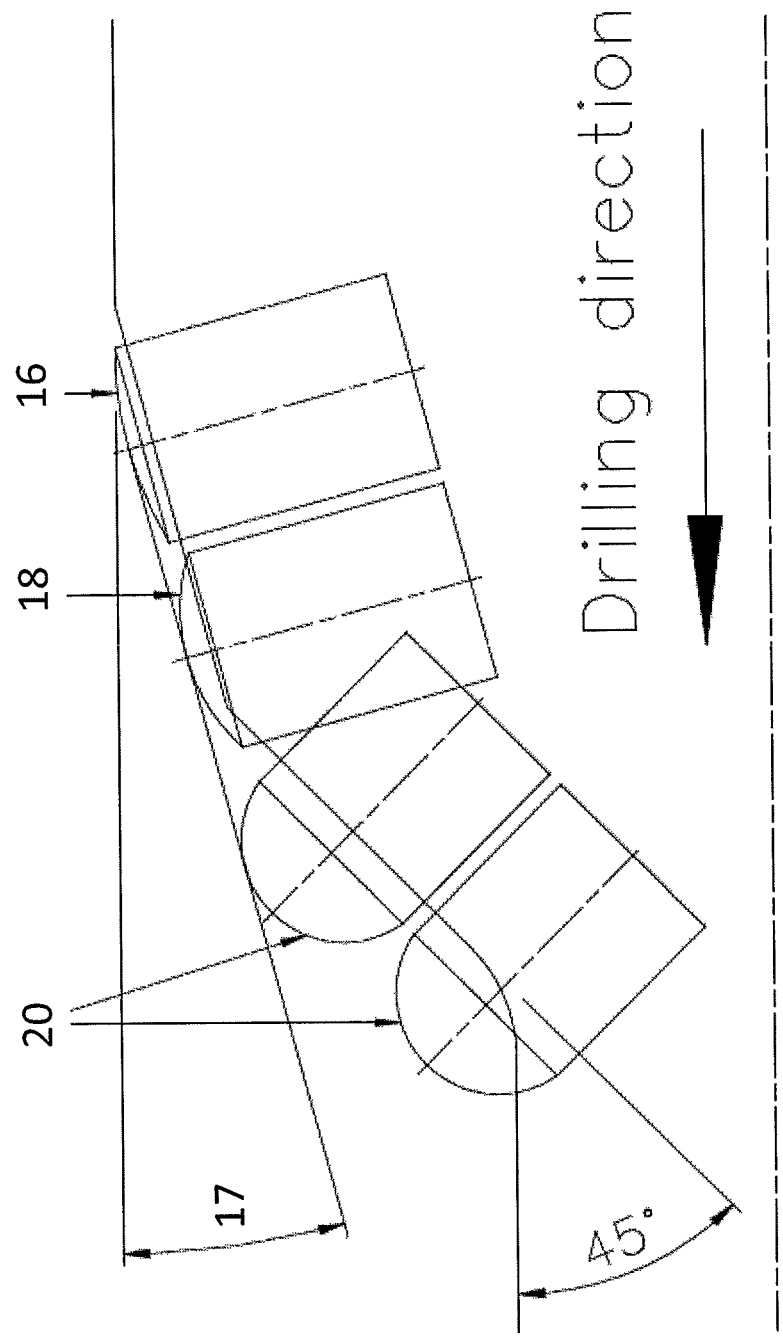

FIGS. 2 and 3 shows in more details embodiments of the junction between the tapered parts and the cylindrical part of a stabilizer-reamer according to the invention. As illustrated, the tapered portions of the stabilizer-reamer according to the invention comprise diamond impregnated inserts having a shape, diameter and length adapted to form a tapered angle 17 which is comprised between 5° and 25°. This relatively smooth angle compared to what is disclosed in the prior art was found to be particularly suitable for the back-reaming and front-reaming functionalities, by increasing the contact surface between the back and front reaming areas and the borehole wall. The diamond impregnated inserts comprise domed inserts 16, 18 and 20 of variable curvature.

Figure 4:
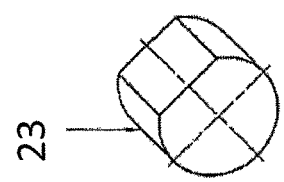
FIG. 4 shows various embodiments of the shapes of the diamond impregnated inserts according to the invention.

FIG. 4 shows various embodiments of the shapes of the diamond impregnated inserts according to the invention, such inserts 16, 18, 20 being used in combination as detailed in the preceding figures. Inserts 20 are full round inserts, while the least curved domed inserts 16 can have a radius of curvature of around 160 mm. Truncated inserts 22 are also disclosed in this figure, such inserts being domed with a flat upper surface. Cylindrical inserts 24 with a flat upper surface and lengthwise truncated cylindrical inserts 23 used in varied embodiments of the invention can also be seen in FIG. 4.

Figure 5:
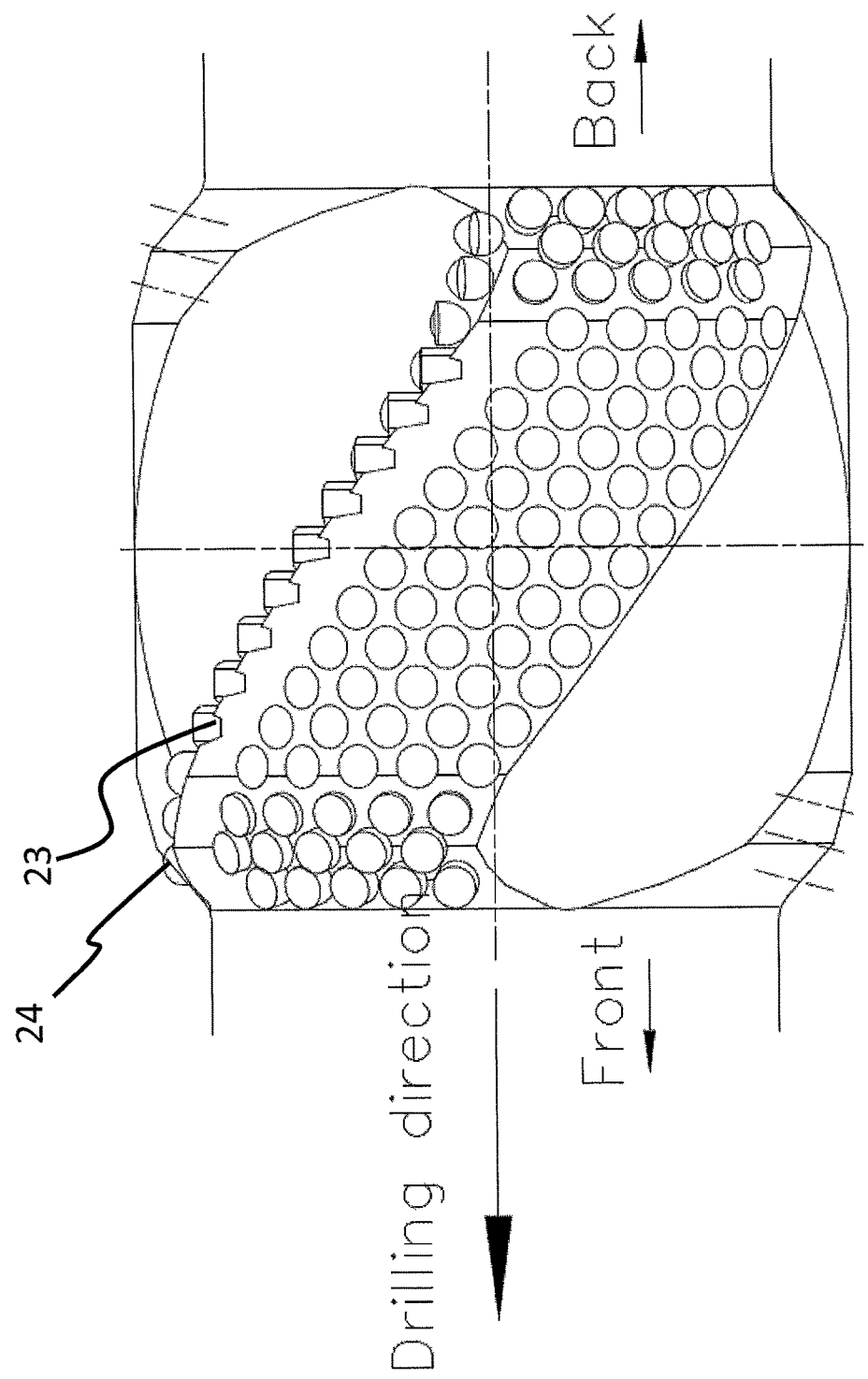
FIG. 5 shows another embodiment of a stabilizer-reamer according to the invention.

FIG. 5 shows another embodiment of a stabilizer-reamer according to the invention, this embodiment being particularly adapted when the formation in the well is ultra-hard and abrasive. This stabilizer-reamer comprises lengthwise truncated inserts 23 in the lateral edges of the helical blades and cylindrical inserts 24 in the tapered parts. The diamond impregnated inserts can be cutting inserts or wear resistant inserts, or a mixture of both.

Figure 6:
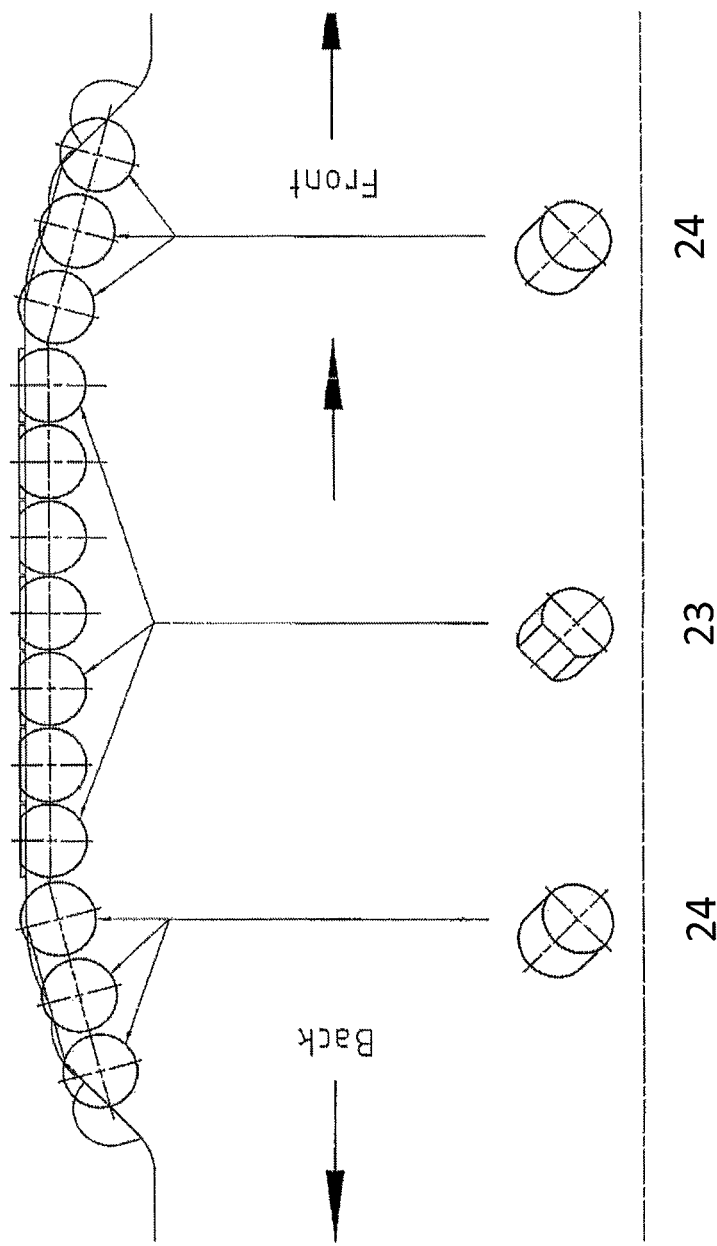
FIG. 6 shows a sectional view of the embodiment from FIG. 5.

FIG. 6 shows a sectional view of the lateral edge of the embodiment from FIG. 5.

Figure 7:
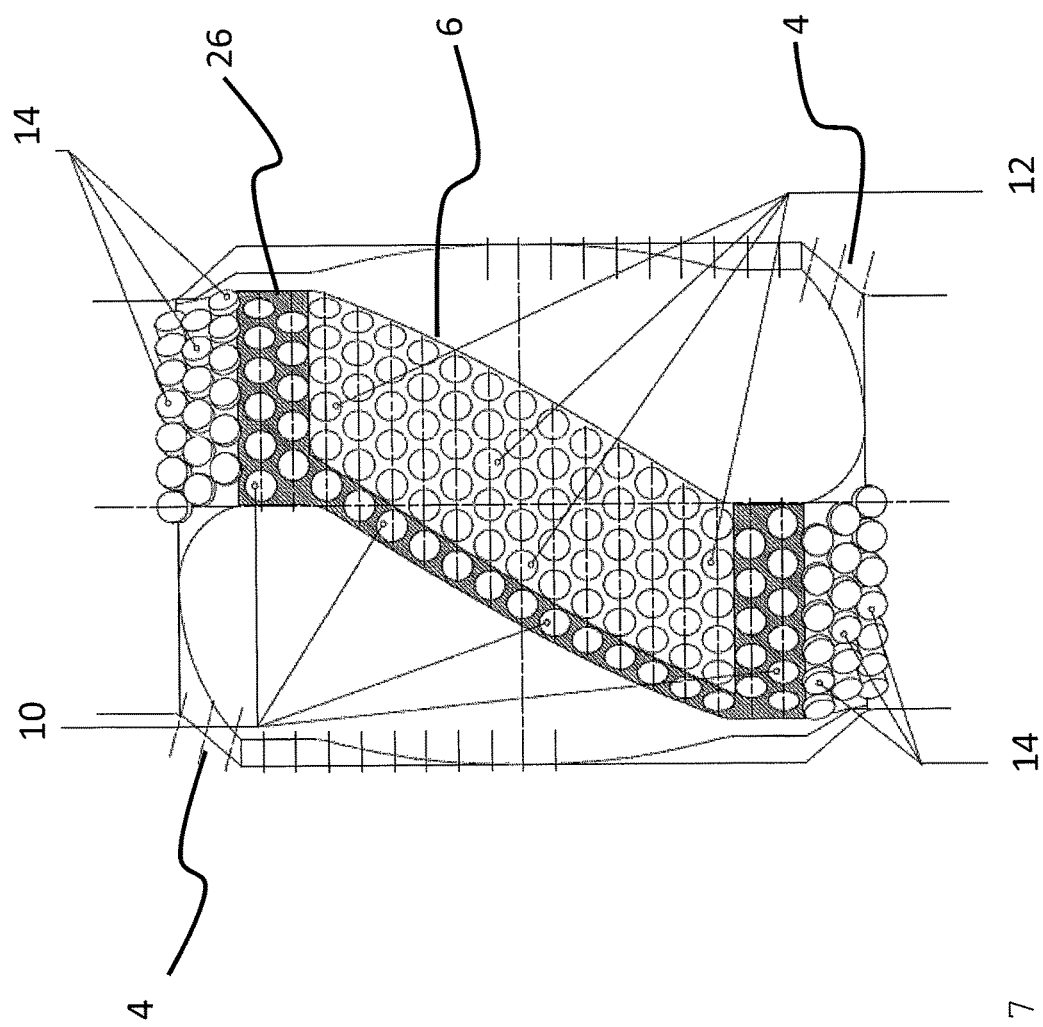
FIG. 7 shows another embodiment of a stabilizer-reamer according to the invention

FIG. 7 shows another embodiment of a stabilizer-reamer according to the invention. Compared to the embodiment of FIG. 1, this stabilizer-reamer has cylindrical transition zones 26 between the helical blades 6 and the tapered parts 4, said cylindrical transition zones 26 comprising two rows of cutting diamond impregnated inserts. The cutting inserts provided in these areas increase the lifespan of the tool because the transition zones between the blades and the tapered parts are areas of the tools highly exposed to destructive shocks with the borehole wall.

Figure 8:
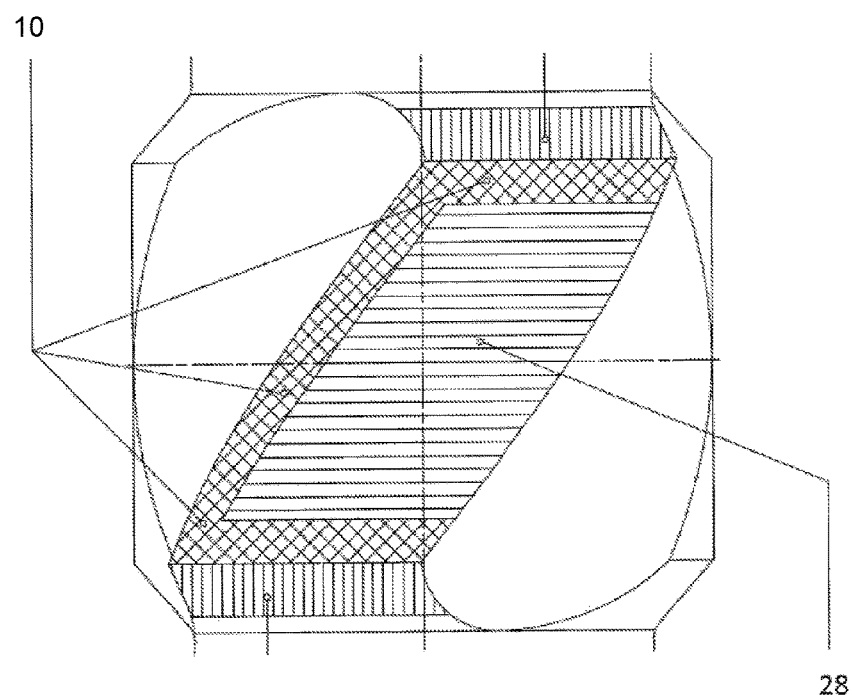
FIG. 8 and FIG. 9 show other embodiments of the stabilizer-reamer according to the invention.
Figure 9:
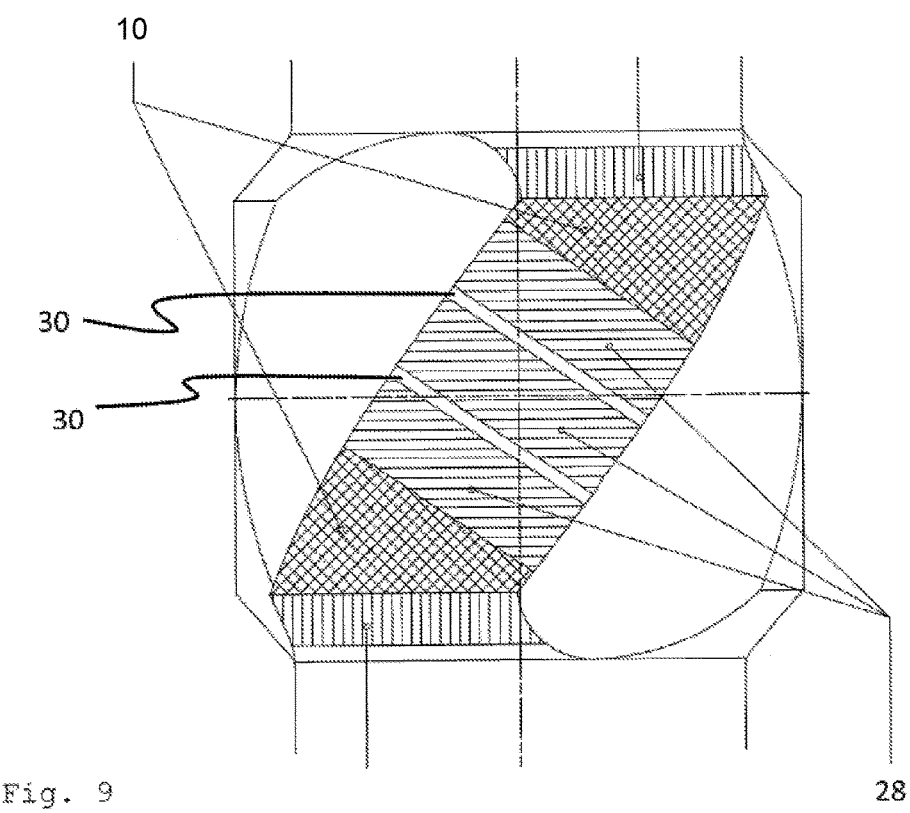

FIG. 8 and FIG. 9 show other embodiments of the stabilizer-reamer according to the invention. In these embodiments, the wear resistant diamond impregnated inserts mentioned in the invention are replaced by a diamond laser cladding 28. The diamond concentration of said diamond laser cladding 28 is comprised between 20 and 35% in volume, and the diamond grit size is comprised between 40/50 mesh ASTM and 120/140 mesh ASTM. In FIG. 8, the diamond laser cladding 28 covers the entire surface of the wear resistant part of the stabilizer. In FIG. 9, diamond laser cladding 28 is set in strips covering the total width of the blade and alternating with steel strip 30 much thinner, such setting avoiding cracks propagation within the diamond laser cladding 28. As can be seen on these figures the two cylindrical edges of the stabilizer are still covered with cutting diamond impregnated inserts 10 brazed in pockets machined in the steel part of the stabilizer.

It will be appreciated by persons skilled in the art that the present invention is not limited by what has been particularly shown and described hereinabove. The invention resides in each and every novel characteristic feature and each and every combination of characteristic features. Reference numerals in the claims do not limit their protective scope. Use of the verb "to comprise" and its conjugations does not exclude the presence of elements other than those stated. Use of the article "a" or "an" preceding an element does not exclude the presence of a plurality of such elements.

The present invention has been described in terms of specific embodiments, which are illustrative of the invention and not to be construed as limiting.

Summarized, the invention may be described as follows:

The invention claimed is:

1. Stabilizer-reamer for a drilling string, wherein the stabilizer-reamer comprises on its outer surface a mixture of diamond impregnated inserts, the mixture comprising cutting diamond impregnated inserts having a diamond grit size comprised between 18/20 and 40/50 mesh ASTM and wear resistant diamond impregnated inserts having a diamond grit size comprised between 40/50 and 120/140 mesh ASTM, said wear resistant diamond impregnated inserts having smaller diamond grain size and higher diamond concentration than said cutting diamond impregnated inserts.

2. Stabilizer-reamer according to claim 1, wherein the cutting diamond impregnated inserts have a diamond concentration comprised between 10% and 35% in volume, and the wear resistant diamond impregnated inserts have a diamond concentration comprised between 35% and 60% in volume.

3. Stabilizer-reamer according to claim 1, wherein the composition of the diamond impregnated inserts comprises at least one metal and one metallic carbide selected from the group consisting of wolfram carbide, titanium carbide, tantalum carbide chromium carbide, vanadium carbide, niobium carbide and molybdenum carbide.

4. Stabilizer-reamer according to claim 3, wherein the diamond impregnated inserts comprise between 50% and 95% of the metallic carbide.

5. Stabilizer-reamer according to claim 1, wherein the diamond impregnated inserts are brazed on the stabilizer-reamer.

6. Stabilizer-reamer according to claim 5, wherein the diamond impregnated inserts are brazed at a temperature lower than 850° C.

7. Stabilizer-reamer according to claim 1, wherein it the stabilizer-reamer comprises a central cylindrical portion and two tapered portions on either side of said central cylindrical portion.

8. Stabilizer-reamer according to claim 7, wherein said central cylindrical portion comprises helical blades.

9. Stabilizer-reamer according to claim 8, wherein the leading and lateral edges of the helical blades comprise one row of cutting diamond impregnated inserts and the central part of the helical blades comprises wear resistant diamond impregnated inserts.

10. Stabilizer-reamer according to claim 8, wherein the stabilizer-reamer comprises, on its outer surface, cylindrical transition zones between the helical blades and the tapered parts, said cylindrical transition zones comprising between two rows and five rows of cutting diamond impregnated inserts.

11. Stabilizer-reamer according to claim 7, wherein the central cylindrical portion comprises the mixture of diamond impregnated inserts, the mixture comprising cutting diamond impregnated inserts and wear resistant diamond impregnated inserts.

12. Stabilizer-reamer according to claim 7, wherein said two tapered portions comprise cutting diamond impregnated inserts, the ratio of cutting inserts being above 50% of the total number of inserts in said mixture of diamond impregnated inserts.

13. Stabilizer-reamer according to claim 7, wherein said two tapered portions comprise, on their outer surface, diamond impregnated inserts having a shape, diameter and length adapted to form a tapered angle between 5° and 25°.

14. Method for adjusting the stabilizing capabilities of the stabilizer-reamer according to claim 1, wherein a friction coefficient between the stabilizer-reamer and a borehole wall is modulated by varying the ratio of the cutting diamond impregnated inserts and the wear resistant diamond impregnated inserts in the mixture of diamond impregnated inserts, wherein the ratio is selected from a value between 0.02 and 0.8.

15. Stabilizer-reamer for a drilling string, wherein the stabilizer-reamer comprises on its outer surface a plurality of cutting diamond impregnated inserts, said cutting diamond impregnated inserts having a diamond grit size comprised between 18/20 and 40/50 mesh ASTM and a diamond concentration comprised between 10% and 35% in volume, and further comprising a central cylindrical portion and two tapered portions on either side of said central cylindrical portion, wherein the central cylindrical portion comprises a diamond laser cladding, the diamond concentration of said diamond laser cladding being comprised between 20 and 35% in volume, and the diamond grit size being comprised between 40/50 mesh ASTM and 120/140 mesh ASTM.

16. Stabilizer-reamer for a drilling string, wherein the stabilizer-reamer comprises on its outer surface a mixture of diamond impregnated inserts, the mixture comprising cutting diamond impregnated inserts having a diamond grit size comprised between 18/20 and 40/50 mesh ASTM and wear resistant diamond impregnated inserts having a diamond grit size comprised between 40/50 and 120/140 mesh ASTM, the stabilizer-reamer comprising a central cylindrical portion comprising helical blades and two tapered portions on either side of said central cylindrical portion, wherein the cutting diamond impregnated inserts are located on a leading and lateral edges of the helical blades and the wear resistant diamond impregnated inserts are located on the central part of the helical blades, and wherein the wear resistant diamond impregnated inserts have a smaller diamond grain size and higher diamond concentration than the cutting diamond impregnated inserts.

* * * * *